United States Patent [19]
Yun

[11] Patent Number: 5,377,781
[45] Date of Patent: Jan. 3, 1995

[54] OIL PICK-UP DEVICE OF COMPRESSOR

[75] Inventor: Duk-Young Yun, Kyonggi-do, Rep. of Korea

[73] Assignee: Samsung Electronics Co., Ltd., Suwon, Rep. of Korea

[21] Appl. No.: 8,324

[22] Filed: Jan. 25, 1993

[30] Foreign Application Priority Data

Feb. 13, 1992 [KR] Rep. of Korea .................... 92-2135

[51] Int. Cl.⁶ .............................................. F01M 11/08
[52] U.S. Cl. ..................... 184/6.23; 184/6.6; 417/902; 96/176
[58] Field of Search .................... 184/6.23, 6.18.6.6, 184/6.16, 11.2; 55/178; 417/902

[56] References Cited

U.S. PATENT DOCUMENTS

| | | | |
|---|---|---|---|
| 4,110,089 | 8/1978 | Müller | 55/178 |
| 4,355,963 | 10/1982 | Tanaka et al. | 417/902 |
| 4,545,743 | 10/1985 | Earley | 417/902 |
| 4,724,928 | 2/1988 | Lewis et al. | 184/6.23 |
| 4,747,471 | 5/1988 | Ballentine et al. | 184/6.23 |

FOREIGN PATENT DOCUMENTS

| | | | |
|---|---|---|---|
| 128170 | 5/1932 | Austria | 184/6.23 |
| 966346 | 7/1957 | Germany | 184/6.23 |
| 63-16588 | 4/1988 | Japan . | |

*Primary Examiner*—Thomas E. Denion
*Attorney, Agent, or Firm*—Burns, Doane, Swecker & Mathis

[57] ABSTRACT

An oil pick-up device of a refrigeration compressor. This device includes an oil pick-up tube for raising a refrigeration oil to a drive part of the compressor. The oil pick-up tube has an annular protrusion for scattering the refrigeration oil ascending an outer surface of the tube and restricting generation of oil foams. The tube also has an air exhaust port for exhausting air bubbles and foreign substances of the refrigeration oil ascending the inside of the tube. This oil pick-up device efficiently scatters refrigeration oil while restricting the generation of oil foams, exhausts air bubbles as well as foreign substances from the refrigeration oil and prevents the generation of a pressure differential to reduce noise.

4 Claims, 4 Drawing Sheets

OIL PICK-UP DEVICE OF COMPRESSOR

BACKGROUND OF THE INVENTION

1. Field of the Invention

The present invention relates in general to an oil pick-up device of a compressor such as a refrigeration tube of the, device to an oil pick-up device which reduces noise by providing an annular protrusion on a cylindrical oil pick-up tube of the device.

2. Description of the Prior Art

Conventionally, domestic or commercial refrigerators have used CFC-12 (Chlorofluorocarbon 12) as a refrigerant. As known by those skilled in the art, there have been proposed and manufactured several types of refrigeration compressors for the refrigerant, CFC-12, with a desired level of noise and operational performance as a result of prolonged improvement of refrigeration technology. However, CFC-12 is known to cause destruction of the ozone layer of the atmosphere and there is the recent trend of limitation of use of CFC-12. Hence, it is required to newly develop a refrigerant, such as HFC-134a (Hydrofluorocarbon 134a), substituting for CFC-12 and design a compressor for the newly-developed refrigerant. On the other hand, the refrigeration compressors require to be provided with refrigeration oil, a kind of lubricant, irrespective of kinds of the refrigerants. It is noted that the refrigeration compressor using HFC-134a should be provided with newly-developed refrigeration oil which agrees with intrinsic characteristics of HFC-134a.

In order to supply the refrigeration oil for drive parts, such as a crankshaft, of the refrigeration compressor, this compressor is generally provided with an oil pick-up device. There have been proposed several types of oil pick-up devices as depicted in FIGS. 1A to 1C, 2 and 3. With reference to these drawings, the known oil pick-up devices include individual inclined oil pick-up tubes 12, 12a, 12b and 12c each of which is fixed to the bottom center of a crankshaft 14 of the compressor. Here, the tube 12 of FIGS. 2 and 3 has a longitudinal slot 10 and a protruded flap 15 covering a part of the slot 10. The other tubes 12a to 12c having no slot and somewhat different constructions of air exhaust ports 11 and protruded flaps 13 and 17, nevertheless have something in common with the protruded flaps.

Hereinbelow, the operational effect of the known oil pick-up devices will be described with reference to the embodiment of FIGS. 2 and 3.

In operation of the compressor, the rotation of the crankshaft 14 makes the oil pick-up tube 12 be rotated in a direction of the arrow of FIGS. 2 and 3. This causes the refrigeration oil, into which the lower part of the tube 12 is submerged, to ascend the outer surface and inner space of the tube 12 due to the intrinsic viscosity of the oil, as well as the centrifugal force generated by the rotation of the tube 12. When the refrigeration oil ascends the outer surface of the tube 12 as described above, the oil runs against the protruded flap 15 and is scattered. This flap 15 is designed to produce an additional function of interception of foams of the refrigeration oil.

However, when this known tube 12 is rotated in the direction of the arrow of FIGS. 2 and 3, there is a pressure difference in the tube 12 in such a manner that the pressure at the part A is higher than that of the part B. This oil pick-up device thus has a problem in that such a pressure difference causes generation of noise and prevents the interception of foams of the oil when the oil is scattered on the flap 15.

Japanese Patent Publication No. Sho. 63-16588 disclosed a known hermetic compressor having another type of oil pick-up device. As depicted in FIG. 4, this hermetic compressor includes a shielding plate 23 for blocking a bottom opening of a crankshaft bearing 18. This shielding plate 23, which is arranged as spaced from and facing a lower end of the crankshaft 9, has a center through hole 24 for introducing the refrigeration oil 19 into the crankshaft 9. The compressor further includes a pump case 21 which is fitted on the lower end of the crankshaft 9 and has a downwardly protruded oil inlet pipe 22. This inlet pipe 22 is inserted into the center through hole 24 of the plate 23.

The shielding plate 23 divides the inner space of the crankshaft bearing 18 into two parts, i.e., upper and lower parts. In this respect, when the refrigeration oil introduced into the upper part of the inner space is rotated by the rotation of the pump case 21 due to the rotation of the crankshaft 9, the rotational force generated in the upper part of the inner space is prevented from being transferred to the refrigeration oil 19 remaining in an oil reservoir. Hence, the surface of the refrigeration oil 19 below the shielding plate 23 descends for the moment lower than the level of the pump case 21 and this generates, even when the oil surface returns to its initial level, no vortex flow at the inlet pipe 22 of the case 21 due to centrifugal force generated at the outside part 21a of the case 21. Accordingly, it is possible to prevent the inlet pipe 22 of the case 21 from having negative pressure. The oil 19 is thus smoothly introduced into an eccentric conduit 20b of the crankshaft 9 and this causes smooth oil supply for the crankshaft 9 as well as prevention of sticking of the bearing 18 to the crankshaft 9. However, this type of oil pick-up device has a problem in that it generates vibration and noise, and furthermore, does not intercept the oil foams which are to be introduced into the upper part of the inner space of the shielding plate 23 through the inlet pipe 22 and the center through hole 24.

SUMMARY OF THE INVENTION

It is, therefore, an object of the present invention to provide an oil pick-up device of a refrigeration compressor in which the above problems can be overcome and which efficiently scatters refrigeration oil while restricting the generation of oil foams, exhausts air bubbles as well as foreign substances floating in the refrigeration oil and prevents generation of pressure difference to reduce noise.

In accordance with an embodiment of this invention, the above object can be accomplished by providing an oil pick-up device of a compressor comprising: an oil pick-up tube for raising a refrigeration oil; an annular protrusion provided on the oil pick-up tube and adapted to scatter the refrigeration oil ascending an outer surface of the oil pick-up tube and to restrict generation of oil foams; and an air exhaust port for exhausting air bubbles and foreign substances of the refrigeration oil ascending the inside of the oil pick-up tube. In accordance with this oil pick-up device, the noise caused by pressure difference of the oil pick-up tube is remarkably reduced.

BRIEF DESCRIPTION OF THE DRAWINGS

The above and other objects, features and other advantages of the present invention will be more clearly understood from the following detailed description taken in conjunction with the accompanying drawings, in which:

FIGS. 5A and 5B show an oil pick-up device of this invention, respectively; in which:
 FIG. 5A is a front view; and
 FIG. 5B is a bottom view;

DETAILED DESCRIPTION OF THE PREFERRED EMBODIMENT

Figure 5A:
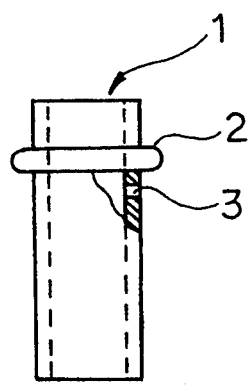
Figure 5B:
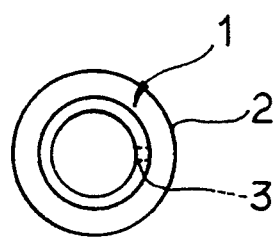

With reference to FIGS. 5A and 5B showing a construction of an oil pick-up device in accordance with this invention, this device includes a cylindrical oil pick-up tube 1 which raises a refrigeration oil to a crankshaft 4 of a refrigeration compressor. This device further includes means for scattering the refrigeration oil ascending the outer surface of the tube 1 and restricting generation of oil foams. In the preferred embodiment of the drawings, this means comprises an annular protrusion 2 which is mounted on a circumferential outer surface of the tube 1. In order to exhaust air bubbles and foreign substances of the refrigeration oil ascending the inside of the oil pick-up tube 1, an air exhaust port 3 is formed on the tube 1 below the annular protrusion 2.

Figure 6:
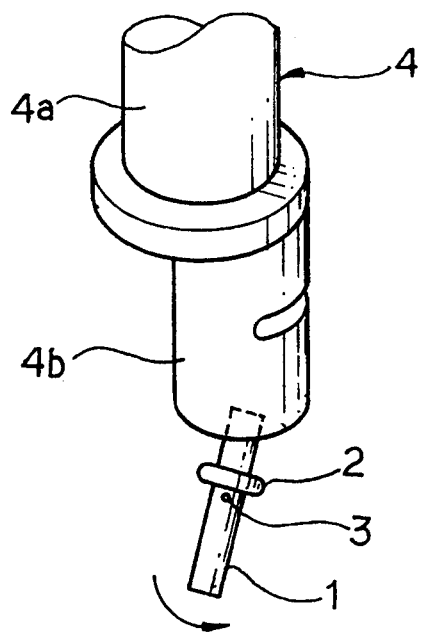
FIG. 6 is a perspective view of the present invention.

FIG. 6 is a perspective view of the crankshaft 4 combined with the oil pick-up device of this invention. The crankshaft 4 includes an upper drive shaft 4a which is rotated upon reception of drive power of drive means (not shown). This drive shaft 4a is integrally formed with an eccentric shaft 4b having a predetermined eccentricity. The crankshaft 4 has a conventional oil conduit (not shown) for introducing the refrigeration oil, which ascends the tube 1, into the eccentric shaft 4b and in turn into the drive shaft 4a of the crankshaft 4. The oil pick-up tube 1 having the annular protrusion 2 and the air exhaust port 3 is connected to the lower part of the oil conduit of the crankshaft 4 such that the tube I is inclined with respect to the oil conduit at a predetermined inclination angle.

In operation of the refrigeration compressor, the rotation of the crankshaft 4 in a direction of the arrow of FIG. 6 generates centrifugal force at the tube 1. Due to the centrifugal force as well as intrinsic viscosity of the oil, this oil ascends the inner space and the outer surface of the tube 1. Here, the oil ascending the outer surface of the tube 1 runs against the annular protrusion 2 to be scattered. At the same time, generation of oil foams on the outer surface of the tube 1 is efficiently restricted by the annular protrusion 2.

Particularly, this annular protrusion 2 has a uniform height and, as a result, there is no pressure difference of the oil pick-up tube 1. In this respect, the present invention remarkably reduces noise in comparison with the prior art as represented in the graphs of FIGS. 7A to 7C and 8.

Figure 1A:
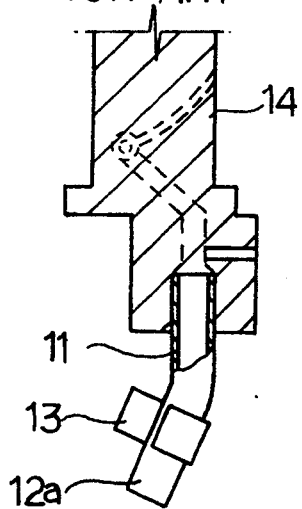
FIGS. 1A to 1C are partially sectioned views of compressor crankshafts combined with different known oil pickup devices, respectively.
Figure 1B:
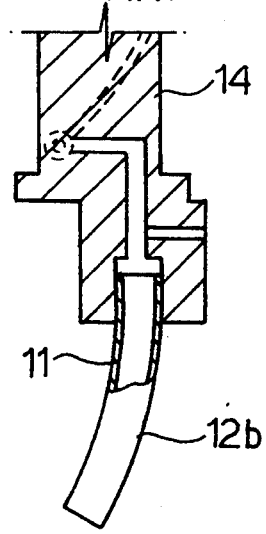
Figure 1C:
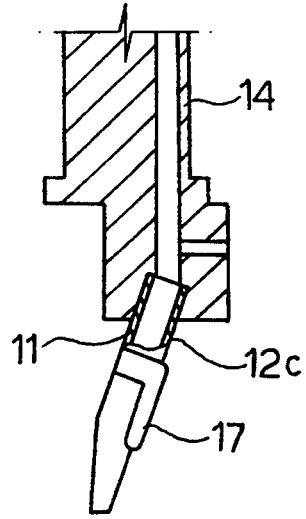
Figure 2:
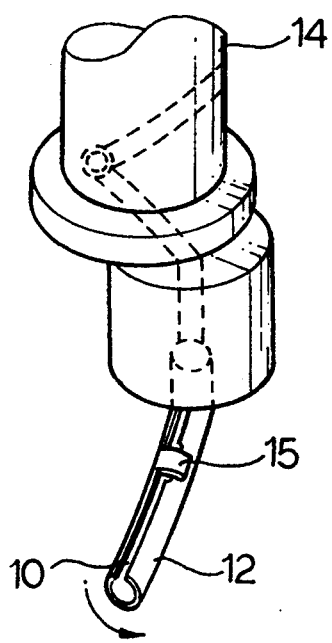
FIG. 2 is a perspective view of a compressor crankshaft combined with another embodiment of a known oil pick-up device.
Figure 3:
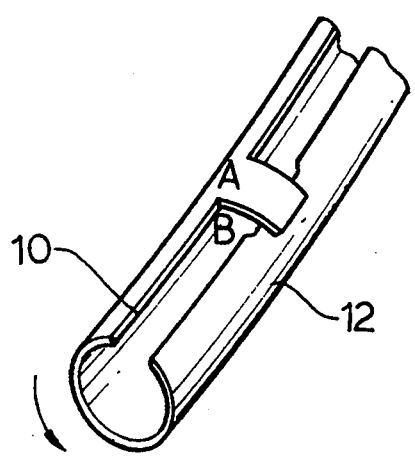
FIG. 3 is a perspective view of the oil pick-up device of FIG. 2.
Figure 4:
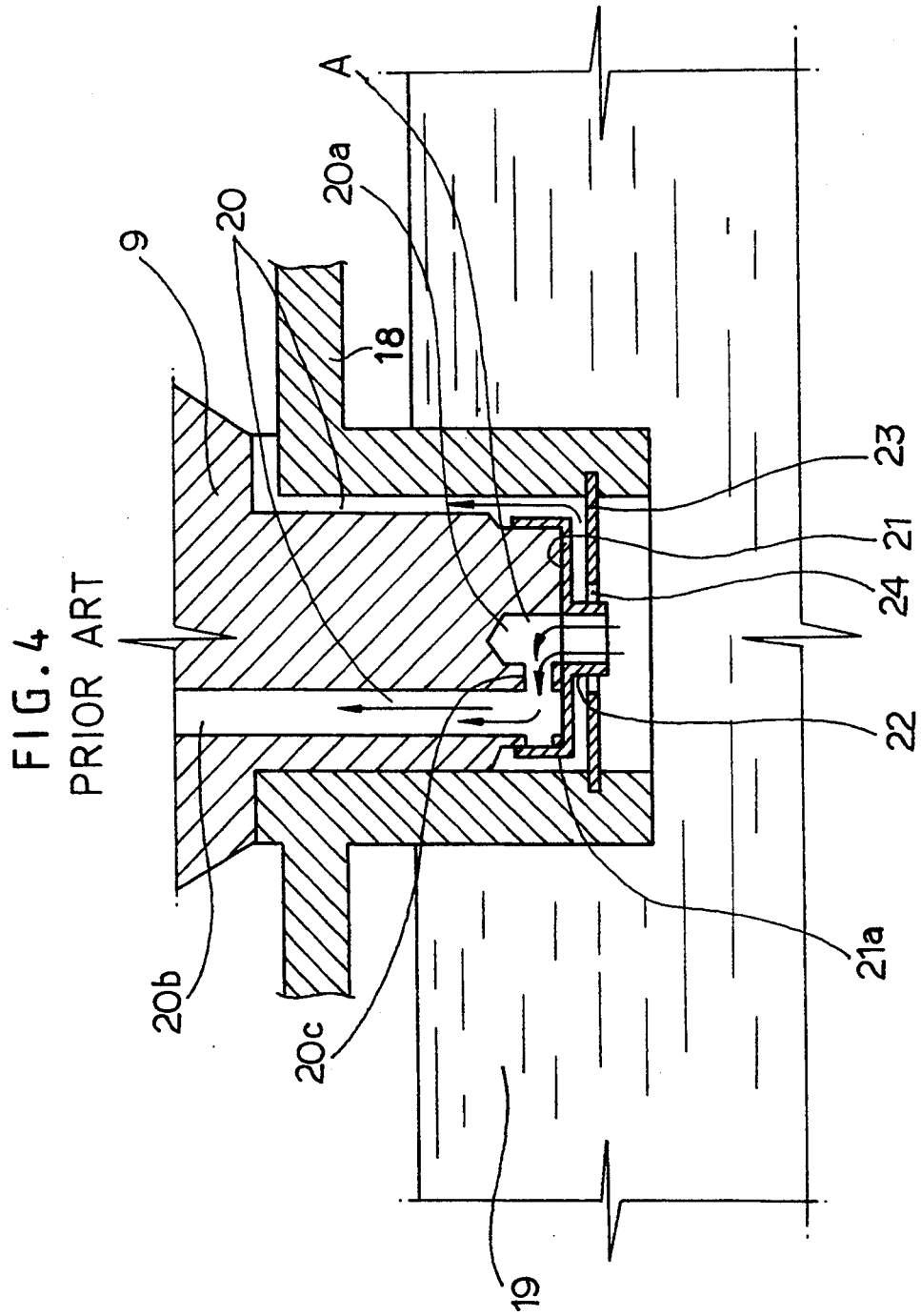
FIG. 4 is a partial sectioned view of a hermetic compressor having another embodiment of a known oil pick-up device.
Figure 7A:
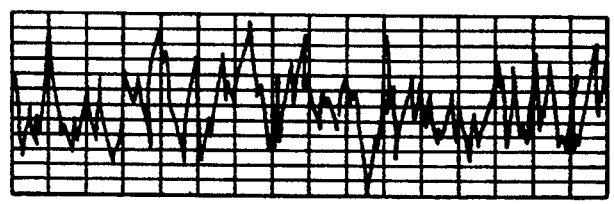
FIGS. 7A to 7C are graphs showing noise characteristics of different known oil pick-up devices, respectively.
Figure 7B:
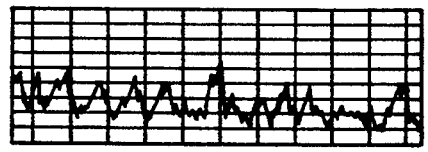
Figure 7C:
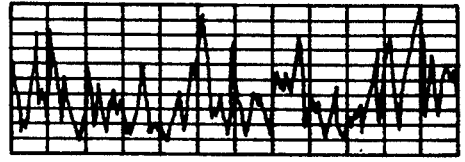
Figure 8:
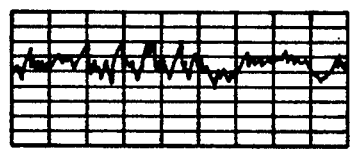
FIG. 8 is a graph showing a noise characteristic of the oil pick-up device of this invention.

FIG. 7A shows a noise characteristic graph of a known oil pick-up device which has the same construction of the device of FIG. 2 but has no protruded flap 15, FIG. 7B shows a graph of the known device of FIG. 2 and FIG. 7C shows a graph of a known device which has the same construction of the device of FIG. 2 but shifts the protruded flap 15 to a lower position. FIG. 8 shows the present invention.

Here, the noise measurements are carried out under the condition of the same pressure and temperature and use of HFC-134a as well as the same refrigeration oil.

Referring to these drawings, it is noted that the noise of this invention of FIG. 8 is remarkably reduced in comparison with the noises of the prior art of FIGS. 7A to 7C.

In accordance with this invention, the air bubbles and foreign substances of the refrigeration oil ascending the inside of the tube 1 are efficiently exhausted to the outside of the tube 1 through the exhaust port 3 formed on the tube 1.

As described above, the present invention provides an pick-up device of a refrigeration compressor which includes an oil pick-up tube which is connected to a lower part of an conduit of a crankshaft of the compressor and inclined with respect to the conduit at an inclination angle. This oil pick-up tube is provided with an annular protrusion for scattering the refrigeration oil ascending the outer surface of the tube and restricting generation of oil foams. This tube is further provided with an air exhaust port for exhausting air bubbles and foreign substances of the refrigeration oil ascending the inside of the oil pick-up tube. Due to such a construction, this device efficiently scatters refrigeration oil while restricting the generation of oil foams, and exhausts air bubbles as well as foreign substances floating on the refrigeration oil. This device also prevents generation of pressure difference along the oil pick-up tube due to the annular protrusion, thereby remarkably reducing noise.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A compressor shaft having a hollow, oil pick-up tube for conducting oil upwardly from a reservoir into the compressor shaft in response to rotation of the compressor shaft, said oil pick-up tube comprising:
    scattering/restricting means for scattering oil ascending an outer surface of said oil pick-up tube and for restricting the generation of oil foam, said scattering/restricting means comprising a protrusion extending completely around an outer perimeter of said oil pick-up tube at a location above a lower end of said oil pick-up tube, and exhausting means for exhausting, to the outside of said oil pick-up tube, air bubbles and foreign substances from oil ascending the interior of said oil pick-up tube.

2. A compressor shaft and oil pick-up tube according to claim 1, wherein said protrusion has a uniform height.

3. A compressor shaft and oil pick-up tube according to claim 1, wherein said exhausting means comprises an air exhaust port extending through said oil pick-up tube at a location below said protrusion.

4. A compressor shaft according to claim 1, wherein said oil pick-up tube has a circular cross-section said protrusion extending annularly around an outer circumference of said oil pick-up tube.

* * * * *